(No Model)
L. F. VAN DE WIELE.
INSULATING JOINT.
No. 585,321. Patented June 29, 1897.
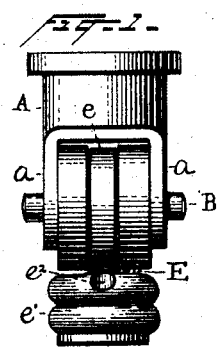
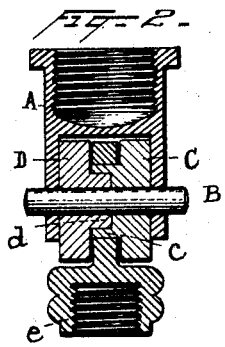
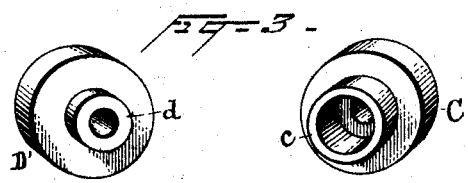
Witnesses
Norris A. Clark.
Jno. R. Taylor.
Inventor
Louis F. Vande Wiele
By his Attorneys
Dyer & Driscoll.

UNITED STATES PATENT OFFICE.

LOUIS F. VAN DE WIELE, OF BROOKLYN, NEW YORK.

INSULATING-JOINT.

SPECIFICATION forming part of Letters Patent No. 585,321, dated June 29, 1897.

Application filed October 14, 1896. Serial No. 608,880. (No model.)

*To all whom it may concern:*

Be it known that I, LOUIS F. VAN DE WIELE, a citizen of the United States, residing at Brooklyn, in the county of Kings and State of New York, have invented a certain new and useful Improvement in Insulating-Joints, of which the following is a specification.

My invention relates to an improved insulating-joint for electric fixtures, which, besides having advantages as an insulating-joint not possessed by those now on the market, may be utilized in other ways in the fixture art.

My invention has for its object the replacing of the cumbersome expensive joints used at present by something which will answer all requirements of insulation perfectly, while being far cheaper to manufacture and more convenient in form. The joint which I am about to describe is for use on electroliers or brackets holding incandescent lamps. Its uses in connection with the support for arc-lamps and for the various purposes for which other insulating-joints are now used will become apparent.

In the drawings, where similar letters indicate corresponding parts, Figure 1 represents a side view of a joint. Fig. 2 shows a section through the center of such joint, the binding-pin being left in full; and Fig. 3 gives perspective views of the two insulating-disks.

The yoke A, adapted to be screwed upon a gas-outlet or other support for the fixture, has arms $a$, in which bearings are cut to receive the binding-pin B. This pin should be of metal or any suitable material. It may be of uniform diameter or may be tapered so as to fit in the bearings only one way, and may, if desired, be headed and secured at the other end by a nut to prevent it from falling out accidentally. Mounted upon this pin, which passes through apertures cut in their center, are two insulating-disks C and D. When in position upon the pin, these disks fit into one another and completely cover the part of pin B between the arms of the yoke. The disk C has a flanged socket $c$. The flange $d$ of the disk D fits into this socket, and thus forms a spool, upon the barrel of which may swing a support E for the fixture. This support or hickey is usually nothing more than a tapped socket $e'$, into which the fixture may be screwed, with a ring $e$, adapted to fit upon the barrel of the insulation-spool formed by the disks C and D. The socket $e'$ should have a hole or holes cut therein, as shown at $e^2$, so as to allow the passage of wires into the interior of the fixture.

To put the joint together, it is only necessary to slip the disk C through the ring of the hickey, the disk D into the flanged socket of C, and after putting them into the yoke binding the whole together by the insertion of the pin B.

It is intended that when the parts are in position the periphery of the hickey-ring should not come flush with the flanges of the insulation-spool formed by the disks, but should be slightly recessed therein, so as to prevent contact between the ring and the yoke. The insulation-disks may be of any material affording sufficient insulation, but are preferably of porcelain. While affording perfect insulation, the parts are simple and easily made and put together. It is impossible in this construction that a short circuit should occur through the cracking and falling away of the insulation, as often occurs in other joints, since even should the insulating-disks crack they are bound together by the parts, so that it is impossible that they should fall out.

The utility of this joint as a combined insulating and swing joint is obvious. It will be seen that the hickey can swing easily in one direction, thus making a very serviceable swing-joint for brackets for electroliers affixed to low ceilings, which are ordinarily swung up out of the way, and wherever a swing-joint may be employed. It is not necessary to put both a swing-joint and an insulating-joint upon a fixture—a thing which every gas-fitter knows is difficult to accomplish while preserving the symmetry and good appearance of the fixture.

By using this joint one not only gets a joint occupying less space than the ones now in use, but obviates the necessity of using a swing-joint as well. It may be readily taken apart and put together again, and that, for instance, in the case of a bracket in a corner, where it is impossible to affix the bracket to its support, owing to the lack of space in which to turn it, the yoke may be independently fixed to the wall-support and the hickey to the bracket and the parts of the joint then put together. Under ordinary circumstances in this case a special joint would have to be constructed at considerable expense. The best point in favor of my joint, however, is its cheapness. Its cost of manufacture is about one-third that of the present forms of insulating-joints. It is absolutely safe and may be made as strong as necessary to support heavy fixtures without nearly the proportionate increase in size necessary in other joints.

Having thus described my invention, what I claim is—

1. An improved insulating-joint, having a yoke, two insulating-disks fitting upon each other, a hickey which fits between said disks and is insulated by them from the binding-pin and the yoke, and a binding-pin which carries the insulating-disks in the yoke, substantially as set forth.

2. An insulating-joint, having in combination a yoke, two insulating-disks between which fits a ringed hickey capable of swinging in one direction upon such insulating-disks, and a pin binding such parts together, substantially as set forth.

This specification signed and witnessed this 1st day of October, 1896.

LOUIS F. VAN DE WIELE.

Witnesses:
EUGENE CONRAN,
JNO. R. TAYLOR.